Figure 1:
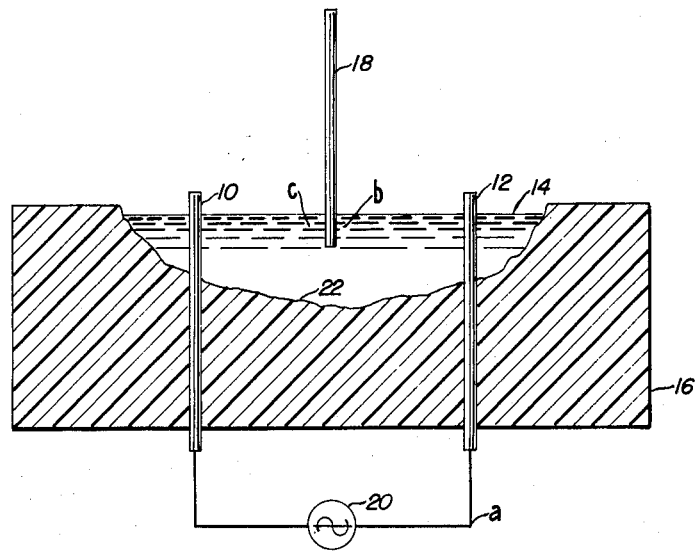

Sept. 21, 1965    L. E. ELLISON ETAL    3,207,977
POTENTIOMETRIC MODEL ENERGIZED BY SQUARE WAVE INPUT MEANS
Filed Aug. 8, 1961

INVENTORS
LYNN E. ELLISON
BY FRANK WALTER

*Edward H. Lang*

ATTORNEY

United States Patent Office 3,207,977
Patented Sept. 21, 1965

3,207,977
POTENTIOMETRIC MODEL ENERGIZED BY SQUARE WAVE INPUT MEANS
Lynn E. Ellison, Crystal Lake, and Frank Walter, McHenry, Ill., assignors to The Pure Oil Company, Chicago, Ill., a corporation of Ohio
Filed Aug. 8, 1961, Ser. No. 130,148
6 Claims. (Cl. 323—99)

This invention is directed to improvements in potentiometric models, whereby errors introduced by phase-shift are substantially eliminated.

Potentiometric models are useful in the study of electric and magnetic fields, and also in using electric-field analogy as an aid in solving problems in fluid-flow, heat-transfer, and other areas of investigation. Potentiometric models are especially useful in determining rates of flow and sweep patterns in the treatment of petroleum reservoirs by secondary-recovery flooding techniques. This application of potentiometric models is discussed in a paper by Hurst and McCarty entitled, "The Application of Electric Models to the Study of Recycling Operations in Gas-Distillate Fields," American Petroleum Institute, Drilling and Production Practice, 1941, pages 228–243.

Potentiometric models comprise a body of electrolyte disposed in a non-conductive container or tank, and a number of electrodes disposed in the electrolyte. Potential is applied between the immersed electrodes and the electric potential is measured at various locations in the body of electrolyte. The shape, location and number of electrodes, as well as the contour of the body of electrolyte, will determine the current-flow patterns in the electrolyte. Current flow, can, by analogy, represent flow of fluids from the location of one electrode to another, or flow of heat from the location of one electrode to another.

Where the system is used to simulate conditions arising in the secondary-recovery of petroleum from subterranean reservoirs, the plan contour of the body of electrolyte can be made to conform with the contours of the reservoir, electrodes are located in positions corresponding to the location of each well in the reservoir, and the vertical dimensions of the body of electrolyte can be shaped to correspond with the thickness and permeability of the oil-containing reservoir. In such systems the number of electrodes can be as high as 100, each electrode representing a single well penetrating the oil-producing formation. A potential-sensing electrode, which is movably supported in the electrolyte, is employed to measure the potential at various locations on the surface of the electrolyte body. In the more sophisticated potentiometric model systems, such as described by Straney in U.S. Patent 2,612,627, the sensing electrode or electrode array is supported to move over a system of horizontal coordinates, so that potential or current flow through the electrolyte can be plotted as a graph. The potential-sensing electrode can be driven by a pair of servo-motors, the servo-motors being operated in response to the potential sensed by the sensing electrode, and the sensed signal being employed to energize intermediate circuits which cause the electrode to follow and plot a given course through the electrolyte which course may be a line of equal potential surrounding a well represented by a fixed electrode. Thus, the model may map a plurality of lines of equal potential, which represent lines of equal pressure in a reservoir subjected to secondary-recovery flooding processes. Alternatively, the potential at a plurality of points in a line perpendicular to one of the plotted lines of equal potential can be measured, and from the differences in potential at these points, knowing the resistance of the electrolyte, the current flow through the electrolyte can be determined. This current is proportional to the rate of fluid-flow of fluids in a reservoir being treated by secondary-recovery flooding processes.

One of the principal difficulties in studying the secondary-recovery operation of oil-field reservoirs by means of potentiometric models, or solving other flow problems by means of potentiometric models, using an A.C. power supply system, has been the inability of the operator to obtain a balance of the input and output fixed electrode currents. The input and output currents are 180° out of phase, and balance can be obtained only as long as this phase relationship persists. Unfortunately, phase shifting occurs in the model, causing the currents to become something other than 180° out of phase. This shift causes a change in the input and output currents applied to the electrodes, and erroneous readings are obtained. Attempts to eliminate this phase shift have met with varying results, but none have met with complete success. Means for compensating for the phase shift are generally employed in association with each electrode. In order to properly adjust the phasing, the output of each electrode, after being fed through an amplifier, is observed on an oscilloscope and adjusted so that it is in phase with a reference voltage. After the inital setting-in of the currents, several rechecks to adjust the phase settings are necessary to obtain the best balance. This is because the adjustment of phase relationship at one electrode influences current flow through the potentiometric model. Where the number of electrodes employed is large, several hours are required to set-in the problems in proper phase relationship. After a problem has been set-in, it is necessary to plot flow lines to insure that the results truly represent field history. Any changes made in production or injection rates for experimental sweep-out and time projection make necessary a complete recheck of the phasing and resulting changes in current values. It is evident that the labor involved in providing adequate compensation for phase shift adds greatly to the time consumed in solving a given problem, adds greatly to the cost of operation of the potentiometric model, and sharply reduces the number of problems which the model may handle in a given period of time.

It is a primary object of this invention to provide an improved potentiometric model system whereby phase shift is substantially completely eliminated.

Another object of this invention is to provide an improved potentiometric model wherein the need for phase-shift compensating circuits is avoided.

Another object of this invention is to provide an improved potentiometric model wherein the necessity for tedious adjustment to eliminate errors induced by phase shift is avoided.

It has been found that by employing an alternating potential, having a substantially square-wave form across the fixed electrodes in contact with the electrolyte, the magnitude of the error induced by phase shift is greatly reduced. It has further been found that by employing electrodes fabricated of a stainless steel, in conjunction with a square-wave applied potential, phase-shift-induced error is substantially eliminated.

While the invention should not be construed as limited to any specific theory of operation, it is believed that the cause of phase shift in current flowing between electrodes of the potentiometric model results from the combination of a capacitance and a resistance existing between the electrodes and the electrolyte.

In order to have phase shifting occur in the circuit, it is probable that one of two conditions must be met, i.e., the circuit must contain either a resistance and a capacitance or a resistance and inductance. It is believed that the first condition exists in potentiometric models, a resistance being present between the probe and the electrolyte, and a capacitance existing probably because of a dielectric substance, such as gas bubbles, adhering to the electrode surface. In fact, any non-conductive coating on the electrode can serve as the dielectric. This coating may be deposited from the electrolyte, or it may be any other non-conductive contamination left on the rod by improper cleaning or handling.

In accordance with this invention, it has been discovered that the application of a square-wave voltage of suitable frequency to the electrode substantially completely eliminates the phase shift. The preferred frequency of the square-wave is about 400 cycles per second, but other frequencies, preferably in the range of about 100–1,000 cycles, may be employed. In retrospect, the effectiveness of this combination of high frequency and square-wave shape may be explained by the fact that the positive and negative levels of the wave reduce polarization in the electrolyte, while the substantially instantaneous switching time from one level of potential to the other level of potential of the square-wave renders the effect of the capacitance in the circuit very slight, since the portion of the cycle over which there is a transition in current and potential is very small.

We have further discovered that the use of certain metals, especially stainless steel, for the electrodes results in a significant decrease in the phase shift. Carbon rods have been found to be superior to all metals for this purpose, and cause the least phase shift, but they suffer from the disadvantage that the electrodes are so fragile that they are not well suited to practical use. Cast iron causes the next lowest phase shift, but it oxidizes very readily in contact with the electrolyte, and is therefore subject to serious disadvantage. It has been found that stainless steels, such as those containing about 70% iron, 20% chromium, and 10% nickel, possess the best balance of corrosion-resistance and low-phase-shift characteristics. Accordingly, they are the preferred materials for fabrication of electrodes for use in potentiometric models. Stainless steel electrodes are far superior to the brass rods conventionally used in prior art potentiometric systems, and are less expensive and superior to gold-plated rods which have occasionally been employed.

Figure 2:
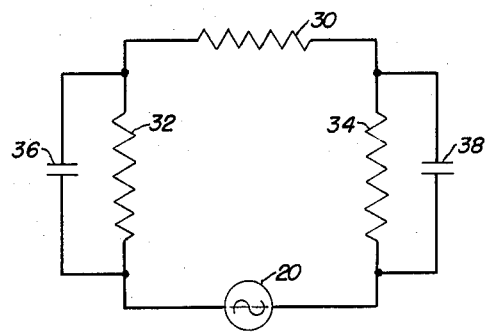

Referring to the drawing,

FIGURE 1 is an elevational view in section of a simple potentiometric model, and FIGURE 2 is a schematic diagram of an equivalent electrical circuit.

It will be observed that FIGURE 1 shows a two-electrode (two-well) model of an oil field wherein electrodes 10 and 12 extend through a body of electrolyte 14 enclosed in contoured tank 16. A sensing electrode 18 is supported, by means not shown, above the tank, and extends into the body of electrolyte. Current flows from the generator 20 to electrode 10, through the electrolyte to electrode 12, and thence back to generator 20. The potential difference which exists between electrode 10 and electrode 12 in the electrolyte represents a pressure differential in an actual petroleum reservoir subjected to secondary-recovery flooding. The potential difference which exists between point "a" in the circuit and point "b" in the electrolyte represents a reservoir pressure measured in relationship to datum level "a." A potential difference also exists between point "c" and point "a." By dividing the difference in potentials of points "b" and "c" in the electrolyte by the resistance of the electrolyte to current flow, the current is obtained. This current is proportional to the fluid-flow rate in the reservoir under study, assuming that the container 16 is contoured at surface 22 to correspond with variations in formation permeability.

The electrical analogy of the simulated problem of FIGURE 1 is shown in FIGURE 2. Resistor 30 represents the resistance provided by the electrolyte, and resistances 32 and 34 represent the resistances existing between the electrodes 10 and 12, respectively, and the body of electrolyte. Capacitances 36 and 38 represent the capacitances existing between the electrodes 10 and 12, respectively, and the body of electrolyte. Assuming that a low-frequency alternating potential, such as a conventional 60-cycle sine-wave, is applied to electrode 10 from generator 20, the capacitive reactance of capacitor 36 is relatively high, and the magnitude of phase shift caused by this capacitance in cooperation with the parallel resistance 32 is very substantial. In a sine-wave current system, the voltage is constantly changing; when it passes through a capacitor the current leads the voltage by about 90°. However, in a square-wave system as used in accordance with this invention, the capacitor produces such a lead of current only during the time of voltage change, which is very small in proportion to the total time of the cycle. Thus, when a 400-cycle square-wave current is used in place of the low-frequency sine-wave current, the effect of the capacitance is virtually eliminated.

The use of 400-cycle square-wave voltage and stainless steel electrodes has permitted the elimination of phase-shifting circuits in the well amplifiers, and has thereby simplified the apparatus necessary to carry out potentiometric studies. Programming time for each problem has been reduced by at least 75%. For example, a 53-well (electrode) problem has been set-in and made ready to plot in 45 minutes, while a similar problem with the conventional sine-wave system frequently required 3 hours because balance was not obtained with the initial setting, and much trial-and-error experimentation was required to adjust the phase-shift compensating circuits to eliminate phase-shift-induced errors.

Plotting time per problem has also been reduced due to the absence of phase shift in the system over a period of time as the probes oxidize. To check the accuracy and drift of the potentiometric model in the course of a program, it has in the past been customary to replot one of the first flow lines from time to time during the run to determine whether repeatable data are obtained. When using 60-cycle sine-wave voltage, the operator was fortunate to find one plot repeatable. With the use of a 400-cycle square-wave voltage in accordance with this invention, repeatable plots have been obtained over periods of time as long as 48 hours.

The embodiments of the invention in which an exclusive property or privilege is claimed are defined as follows:

1. In a potentiometric model comprising a non-conductive vessel adapted to correspond to the contours of a reservoir, a body of electrolyte, disposed in said vessel, a plurality of electrodes suspended in said electrolyte, and a sensing electrode movably supported to sense potential in said electrolyte and means to measure the sensed potential, the combination of means for impressing a substantially square-wave potential across the electrodes of said plurality.

2. An apparatus in accordance with claim 1 in which the electrodes of said plurality are fabricated of a material selected from the group consisting of carbon, cast iron, and stainless steel.

3. An apparatus in accordance with claim 2 in which said electrodes are fabricated of stainless steel.

4. An apparatus in accordance with claim 3 in which said movable electrode is fabricated of stainless steel.

5. An apparatus in accordance with claim 4 in which said means for impressing a square-wave potential has an output frequency of about 100–1,000 cycles per second.

6. In a potentiometric model comprising a non-conductive vessel adapted to correspond to the contours of a reservoir, a body of electrolyte, disposed in said vessel, a plurality of electrodes suspended in said electrolyte, a sensing electrode movably supported to sense potential in said electrolyte, and means to measure the sensed potential, the improvement consisting of stainless steel electrodes as said plurality and means for impressing a substantially square-wave potential across the electrodes of said plurality, the output frequency of said square-wave means being about 400 cycles per second.

References Cited by the Examiner

UNITED STATES PATENTS

| | | | |
|---|---|---|---|
| 2,239,466 | 4/41 | Neufeld | 324—1 |
| 2,397,962 | 4/46 | Hartz | 323—99 |
| 2,470,153 | 5/49 | Feller | 324—30 |
| 2,569,867 | 10/51 | Norelius | 324—1 |
| 2,612,627 | 9/52 | Straney | 324—29 |
| 2,779,912 | 1/57 | Waters | 324—1 |
| 3,017,612 | 1/62 | Singer | 324—94 |

LLOYD McCOLLUM, *Primary Examiner.*

RALPH D. BLAKESLEE, *Examiner.*